(12) United States Patent
Scharfenberger et al.

(10) Patent No.: US 11,565,721 B2
(45) Date of Patent: Jan. 31, 2023

(54) TESTING A NEURAL NETWORK

(71) Applicant: Conti Temic microelectronic GmbH, Nuremberg (DE)

(72) Inventors: Christian Scharfenberger, Lindau (DE); Michelle Karg, Lindau (DE)

(73) Assignee: Conti Temic Microelectronic GmbH

( * ) Notice: Subject to any disclaimer, the term of this patent is extended or adjusted under 35 U.S.C. 154(b) by 375 days.

(21) Appl. No.: 16/652,157

(22) PCT Filed: Oct. 4, 2018

(86) PCT No.: PCT/DE2018/200091
§ 371 (c)(1),
(2) Date: Mar. 30, 2020

(87) PCT Pub. No.: WO2019/068291
PCT Pub. Date: Apr. 11, 2019

(65) Prior Publication Data
US 2020/0247433 A1 Aug. 6, 2020

(30) Foreign Application Priority Data
Oct. 5, 2017 (DE) ...................... 10 2017 217 733.0

(51) Int. Cl.
*B60W 60/00* (2020.01)
*G06K 9/62* (2022.01)
(Continued)

(52) U.S. Cl.
CPC ..... *B60W 60/00259* (2020.02); *G06K 9/6267* (2013.01); *G06N 3/0481* (2013.01); *G06N 3/08* (2013.01)

(58) Field of Classification Search
CPC .......... B60W 60/00259; G06K 9/6267; G06K 9/627; G06N 3/0481; G06N 3/08; G06V 10/82; G06V 20/56
See application file for complete search history.

(56) References Cited

U.S. PATENT DOCUMENTS

2017/0291611 A1* 10/2017 Innes ................... G07C 5/0841
2017/0371348 A1* 12/2017 Mou ...................... G01S 17/87

FOREIGN PATENT DOCUMENTS

CN 106203619 * 5/2016

OTHER PUBLICATIONS

Machine translation for CN 106203619 (Year: 2016).*
(Continued)

*Primary Examiner* — Qian Yang
(74) *Attorney, Agent, or Firm* — RatnerPrestia (57) ABSTRACT

The present invention relates to a computer-implemented method and a system for testing the output of a neural network (1) having a plurality of layers (11), which detects or classifies objects. The method comprises the step (S1) of reading at least one result from at least one first layer (11) and the confidence value thereof, which is generated in the first layer (11) of a neural network (1), and the step (S2) of checking a plausibility of the result by taking into consideration the confidence value thereof so as to conclude whether the object detection by the neural network (1) is correct or false. The step (S2) of checking comprises comparing the confidence value for the result with a predefined threshold value. In the event that it is concluded in the checking step (S2) that the object detection is false, output of the object falsely detected by the neural network is prevented.

14 Claims, 2 Drawing Sheets

(51) Int. Cl.
G06N 3/04 (2006.01)
G06N 3/08 (2006.01)

(56) References Cited

OTHER PUBLICATIONS

English translation of the International Search Report of the International Searching Authority for International Application PCT/DE2018/200091, dated Jan. 15, 2019, 1 page, European Patent Office, HV Rijswijk, Netherlands.

PCT International Preliminary Report on Patentability including English Translation of PCT Written Opinion of the International Searching Authority for International Application PCT/DE2018/200091, dated Apr. 8, 2020, 7 pages, International Bureau of WIPO, Geneva, Switzerland.

German Search Report for German Patent Application No. 10 2017 217 733.0, dated Feb. 27, 2018, 11 pages, German Patent and Trademark Office, Muenchen, Germany, with partial English translation, 6 pages.

Xin Li et al., "Adversarial Examples Detection in Deep Networks with Convolutional Filter Statistics", Computing Research Repository (CoRR), Cornell University Library, Ithaca, NY, Dec. 22, 2016, XP080742529, https://arxiv.org/abs/1612.07767v1, retrieved on Feb. 26, 2018, pp. 1 to 9.

Tianyu Pang et al., "Robust Deep Learning via Reverse Cross-Entropy Training and Thresholding Test", Computing Research Repository (CoRR), Cornell University Library, Ithaca, NY, Jun. 2, 2017, XP080767067, https://arxiv.org/abs/1706.00633v1, retrieved on Feb. 27, 2018, pp. 1 to 20.

Nicholas Carlini et al., "Adversarial Examples Are Not Easily Detected: Bypassing Ten Detection Methods", Computing Research Repository (CoRR), May 20, 2017, https://arxiv.org/abs/1705.07263v1, retrieved on Feb. 27, 2018, pp. 1 to 14.

Lovedeep Gondara, "Detecting Adversarial Samples Using Density Ratio Estimates", Computing Research Repository (CoRR), May 17, 2017, https://arxiv.org/abs/1705.02224v2, retrieved on Feb. 27, 2018, pp. 1 to 11.

Abhijit Bendale et al., "Towards Open Set Deep Networks", IEEE Conference on Computer Vision and Pattern Recognition (CVPR), 2016, https://doi.org/10.1109/CVPR.2016.173, retrieved on Feb. 26, 2018, pp. 1563 to 1572.

Reuben Feinman et al., "Detecting Adversarial Samples from Artifacts", Computing Research Repository (CoRR), Nov. 15, 2017, https://arxiv.org/abs/1703.00410v3, retrieved on Feb. 27, 2018, pp. 1 to 9.

Anh Nguyen et al., "Deep Neural Networks are Easily Fooled: High Confidence Predictions for Unrecognizable Images", In Computer Vision and Pattern Recognition (CVPR), IEEE, 2015, 20 pages.

* cited by examiner

TESTING A NEURAL NETWORK

The invention relates to a method and a system for testing the output of a neural network. The invention additionally relates to a vehicle having such a system, a program element and a computer-readable medium.

In today's automobiles, camera-based driver assistance systems make an important contribution to improving road traffic safety such as, for example, adaptive cruise control (ACC), emergency brake assist (EBA) and lateral control functions (LCF), such as e.g. road or lane departure prevention "oncoming" (RDP/LPD oncoming). The aim of these systems is the robust detection and classification of objects, lanes and environmental scenarios. Here, computer vision and machine learning architectures, which are based on deep learning, make a significant contribution to the robust detection of features and objects. Very effective and powerful neural networks, such as e.g. ResNet, GoogleNet or VGG-16, have been created in the past precisely to improve object detection. The neural networks deployed typically have a great depth and they are trained with large data sets (training data).

The robust detection of objects plays an important role in neural networks. The aim here is to reduce the number of objects which are not detected for applications such as ACC, and to reduce the number of false detections, "false positives", for applications such as EBA or RDP/LDP oncoming.

The introduction of convolutional neural networks (CNN) and deep neural networks (DNN) has made it possible to increase the detection and classification of objects and features, in particular thanks to end-to-end learning. In this case, the neural network itself learns and determines the suitable features for detecting objects from the training data during the training. In contrast to classical detection approaches, there is a disadvantage to these networks: the networks can be deceived. This was addressed, for example, in the document "Deep Neural Networks are Easily Fooled: High Confidence Predictions for Unrecognizable Images" by Nguyen et. al. from 2015.

It is an object of the invention to improve the object detection and classification of a neural network.

This object is achieved by the subject-matter of the independent claims. Embodiments and further developments can be inferred from the dependent claims, the description and the figures.

A first aspect of the invention relates to a computer-implemented method for testing the output of a neural network having a plurality of layers, which detects or classifies objects. The method comprises the following steps:
  reading at least one result from at least one first layer and the confidence value thereof, which is generated in the first layer of a neural network (NN);
  checking a plausibility of the result by taking into consideration the confidence value thereof so as to conclude whether the object detection by the neural network is correct or false;
  wherein the first checking step includes comparing the confidence value for the result with a predefined threshold value, and
  wherein in the event that it is concluded in the first checking step that the object detection is false, output of the object falsely detected by the neural network is prevented.

The complete result of at least one layer of the neural network is preferably checked, that is to say the result in each case of all nodes which are contained in said layer.

A neural network can be trained with training data before it is put into operation. The layers consist of nodes connected to one another. Activation functions are assigned to each of the nodes. The connections between the nodes can be quantified by weightings. The individual nodes (or subsets of such nodes) form mathematical filters. During the training these filters can be generated or respectively set in the individual layers after the weightings, by means of which the individual layers and/or nodes/filters are connected, have been initialized. The filters in the layers can in each case be responsible for a specific feature or feature component during the later operation of the neural network. During the training, the outputs of the neural network can be matched with a desired output of the neural network. The output can be optimized to the desired output by means of the filters, the layers and the weightings between the layers, such that the trained neural network generates the desired output for specific input data.

During the operation of the neural network, the neural network can be supplied with input data, for example the input data can be generated by sensors. These input data can be analyzed by the filters of the individual layers of the neural network. To this end, the filters generate filter responses, wherein the filter responses are generated by features in the input data and correspond therewith. Consequently, it is possible to conclude that specific features exist in the input data, based on the filter responses. The filter responses can comprise confidence values for each feature detected in the input data. Such a confidence value is a measure of the reliability or plausibility of the respective feature detection. The confidence value can for example be a probability, that is to say e.g. with which probability the filter "means" that the feature detected by it has been correctly detected. However, the confidence value can also be a statistical confidence or another parameter, or a combination of a plurality of confidence values and parameters, depending on the implementation. The features detected by the filters can be merged into one object or one larger feature in the layers or respectively can be classified into larger object classes. These detected objects should correspond to the real objects present in the input data. The objects detected and classified by the respective layer or by the neural network can additionally be provided with a confidence value which states how "sure" the layer or the neural network is that the object has been correctly detected and/or classified. These object-related confidence values can be defined in a similar way to the feature-related confidence values explained above.

The input data can, for example, originate from a vehicle camera sensor as an input image. Convolutional neural networks (CNNs) have proven to be advantageous for object detection from image data. CNNs are based on an input layer, intermediate layers and output layers. The input and intermediate layers are based on convolutions; these convolutions are realized as follows in the network architecture:

They consist of a set of convolution filters, e.g. consisting of convolution kernels of the size 3×3, 5×5, or 7×7 pixels; each of these convolution filters is gradually slid across the input image and/or intermediate results (activation maps) of the previous layers. An activation map is the (two-dimensional) result of the application of a convolution filter. The following operations are performed for each position: multiplication, normalization, summation, addition of a bias and one or more nonlinear functions (the sequence depends on the network architecture). According to this method, an activation map is assigned to each of these convolution filters at the output of a layer. Consequently, a set of activation maps is calculated for each layer of a neural network. Positions in these activation maps correlate to positions in the image area (perceptive field).

Such a set of activation maps for this layer can be referred to as the "result(s) of a layer" of a neural network.

The results of a layer (set of activation maps) can be combined at will in a neural network. The concatenation of results and the continuation in one or more following layers are standard practice.

The output layers are either likewise convolution layers or fully connected layers. The neurons of the last output layers predict e.g. the class of an object, the localization of an object, attributes of an object, etc.

The activations of the respective output layers can likewise be referred to as the "result(s) of a layer" of a neural network.

In other words, the first method step for this case could be described as follows: reading at least one result from at least one activation map of a layer and the confidence value thereof, which has been generated in the layer as an activation.

In other words, the object detection by a neural network can consist of a step for extracting features, a processing unit for generating object hypotheses and a unit for classifying objects.

The various strata or respectively plies of the neural network ("NN") are referred to as layers. Therefore, the term "layer" is used synonymously with the term "stratum" or respectively "ply" within the context of the present invention. A neural network typically comprises at least one layer. Deep neural networks (deep NNs), neural networks having at least three layers, i.e. neural networks having at least one hidden layer between an input layer (in which the input data are created) and an output layer (in which the result or respectively the output of the object detection takes place) are preferred. It is common for a neural network to comprise a multiplicity of different layers of different complexity in deep neural networks. Each layer can, in turn, comprise a multitude of filters. Furthermore, the individual layers are connected to one another via different weightings.

In the proposed method, a plausibility tester or a "safety barrier" can, for example, be introduced into the architecture of the neural network. Said plausibility tester can perform the first checking step. For example, the plausibility of the result of a layer can be checked in the first checking step by high filter responses and the confidence values thereof for one or more filters of a layer of the neural network. The plausibility tester which performs the first checking step can consist, for example, of a simple method which checks the plausibility of the result or respectively of the results of the neural network or of the individual layers of the neural network by means of threshold value technology.

In other words, the output of the neural network or of a layer of the neural network can be checked for plausibility by an independent entity. This can be effected, for example, by the plausibility tester. If it is established in the first checking step that the result of the checked layer of the neural network or the output of the neural network appears to be plausible, it can be concluded that the object detection by the neural network is correct. If, on the other hand, it is established in the first checking step that the result of the checked layer of the neural network or the output of the neural network is implausible, it can be concluded that the object detection by the neural network is false (e.g. by virtue of a deception). Consequently, the neural network can be prevented from emitting a false output or respectively a false result, which in turn leads to improved object detection by the neural network. It can consequently be prevented or at least the frequency can be reduced that objects are not detected, or that objects are erroneously detected, i.e. an object has supposedly been detected, although there is no object to be detected present.

In a first step, the result and the confidence value for said result of one or more layer(s) of the neural network can be read, for example by the plausibility tester. The output of the neural network or the result of the layer of the neural network can subsequently be checked for the plausibility of the result or respectively of the object detection, wherein this is checked by taking into consideration the confidence value for the result. In a further step, the confidence value for the result can be compared with a predefined threshold value. This predefined threshold value can be e.g. 90%, 95% or 99%.

The predefined threshold value can be fallen below or exceeded. Alternatively or additionally, two threshold values can also be provided, which form an upper threshold (maximum acceptable confidence value) and a lower threshold (minimum acceptable confidence value). The threshold value can additionally be determined manually or automatically. It should be noted that a plurality of different threshold values can be enlisted as a comparison depending on the position of the layer or respectively of the filter within the neural network. In addition to the absolute threshold value, a relative threshold value can also be utilized such that considerable fluctuations in the confidence values between temporally neighboring input data exceed the relative threshold value. According to a further embodiment of the invention, the threshold value can be determined automatically; this can take place in particular within the framework of the training of the neural network. To this end, the neural network can be deliberately supplied with manipulated input data in order to provoke implausible filter responses and corresponding confidence values. The behavior of the neural network thus provoked can be taken into consideration in the determination of the relevant threshold value for each filter or respectively each layer.

Alternatively or additionally, one-class classification approaches (also known as outlier detection, novelty detection or abnormality detection) can be used in order to train the respective threshold values automatically without any deception examples. Furthermore, the respective threshold values can also be learned by means of training consisting of a combination of supervised learning with deception examples and one-class classification. The output of the threshold values can be binary (within the range of validity, outside the range of validity), consist of three values (underflow, overflow, within the range of validity) or continual. The output format can differ for the individual neurons, filters and layers of the neural network.

In the case of real input data, such as e.g. image data of a camera, confidence values below 90% typically occur, since the input data are influenced by the sensor itself, for example by noise or environmental influences. High confidence values of, for example, 90% and more indicate defective object detection by the neural network. The predefined threshold value can also be adjusted to each layer to be checked such that the checking of the plausibility of the result can be adjusted to each neural network and the architecture thereof.

The plausibility of the result can be checked in various ways. This can in particular depend on the type of plausibility tester and the position of the layer to be checked within the neural network. Alternatively or additionally, the method or respectively the checking step of the method can provide for the or respectively all of the results of a plurality of or respectively all of the layers of the neural network and the confidence values thereof to be checked for plausibility in a higher-level validation layer so as to conclude whether the object detection by the neural network is correct or false.

Alternatively or additionally, the checking step can for its part comprise an object detection, based on the same input data as the neural network to be checked. This (second) check can be activated or respectively triggered by an abnormality in the existing neural network, which has been detected in the first checking step. For example, the confidence value for a layer or a filter can be implausibly high or low or a filter response rigorously identifies a specific feature in the input data. The result of the object detection of the second checking step and the result of the neural network can subsequently be compared. The second checking step can additionally comprise a comparison with a list which includes known false detections of the neural network to be checked. During the comparison, the list can be matched with the input data of the neural network. In other words, the plausibility tester can already know input data which result in a false object detection in the neural network or respectively in a layer of the neural network.

Alternatively or additionally, the checking step can provide for the confidence value for the layer of the neural network to be checked to be enlisted in order to check the plausibility of the result of the layer of the neural network. The method can further provide for an implausibly high or low confidence value regarding a feature of the input data to be detected and, as a result, conclude that the object detection by the neural network is false. This can be the case, for example, if the confidence value for the result of the layer of the neural network or respectively of the output of the neural network (of the object detection) is e.g. more than 90%, 95% or 99% or respectively below 15%, 10% or 1%.

The plausibility of the result of a layer can additionally be checked on the basis of an analysis of the filter responses in the checking step. If, for example, the filter responses are high or respectively swing in value extremely in the case of certain input data, this can indicate an abnormal behavior of the neural network. Said abnormal behavior can, for example, be caused by a targeted attack from outside such as e.g. an "adversarial attack", for example by supplying the neural network with manipulated input data. A manipulation can arise due to an altered image or by directly supplying the neural network with data, without the input data being gathered by a sensor. Said manipulated input data can result in high filter responses in individual filters, and an object detection having a high confidence value is the consequence, although the input data have little in common with the actual, supposedly detected, objects. For example, the neural network can detect noise as an object or classify an object A as another object B. On the other hand, in the case of real input data from natural objects, no such high confidence values and high filter responses occur, e.g. superimposed blurring of the camera or noise tends to result in rather lower confidence values in the individual filters and layers of the neural network.

Classification algorithms can additionally be enlisted in order to draw conclusions about a malfunction of the neural network, based on combinations of the confidence values. Here, algorithms such as random forests, decision trees, support vector machines, Markov random fields, graphic models, logistic regression, Bayesian models or small neural networks can be used. These make possible nonlinear decision boundaries in a decision tree consisting of the confidence values for individual layers, filters, neurons, subnetworks or of the entire network.

By deploying the method described above and below, the object detection by the neural network can be made more efficient, since it is not necessary to calculate the complete neural network if it is concluded that the object detection or respectively classification by the neural network is false. For its part, the method described above and below can additionally be implemented in a very resource-sparing manner, for example directly in an embedded system. On the other hand, the confidence values for the neural network to be checked are taken into consideration for a check and, if applicable, the output of the neural network is checked and consequently the plausibility thereof checked by a further classifier or a blacklist/whitelist.

The method can be carried out, for example, by the plausibility tester which can be realized by a processor on a control unit. The method can work and be performed independently of the neural network to be checked. In particular, the method can be performed in parallel with the neural network to be checked.

Alternatively or additionally, a plurality of different neural networks can be checked by the method, or a neural network can be checked by means of a plurality of different checking steps, based on different methods. Interfaces for reading the result and the confidence value thereof for the layer of the neural network to be checked can advantageously be provided in the neural network to be checked.

In order to simplify the description, the term "object detection" is used in general and refers to any kind of detection such as, for example, lane detection, road user detection, traffic sign detection, gesture detection and/or face detection.

The construction of the neural network is referred to as architecture or respectively network architecture, that is to say how many layers the neural network comprises and how the individual layers are designed. The weightings and filters in or between the individual layers can additionally influence the architecture of the neural network. Deep neural networks typically comprise a multiplicity of layers which are connected to one another by means of different weightings.

According to a further embodiment of the invention, it is concluded whether the object detection by the neural network is correct or false if the confidence value for the result exceeds or falls below the predefined threshold value.

In other words, the confidence value or respectively the confidence values can directly serve to conclude whether the result of the layer of the neural network is plausible. Real input data are typically captured by sensors; consequently, these are influenced by the sensor itself or environmental influences (noise, dirt, fog, darkness, backlight). This produces a confidence value of below, for example, 80%, 85% or 90% during the later object detection by the neural network.

According to an embodiment of the invention, a second checking step is only performed if (in the first checking step) the confidence value for the result exceeds or falls below a predefined threshold value or if a combination of confidence values for filters and/or layers exceed or fall below their respective threshold values. Output of the object falsely detected by the neural network is only prevented if the second checking step confirms that the object detection is false.

The second checking step can enlist the confidence values for the layers of the neural network for checking the plausibility of the result of the layer. The second checking step can additionally be activated or respectively triggered in the first place by a high confidence value in a layer of the neural network. In other words, the plausibility tester can consider the result of a specific layer then more closely and check for plausibility if the confidence value for the result of said layer exceeds or falls below a predefined threshold value. As a result, a two-step and efficient method for checking the output of a neural network can be created. In other words, the result of a specific layer of the neural network is checked more precisely and in greater detail, if an initial indication of a false object detection, here an implausible confidence value, has been detected. Consequently, the method can be optimized and computing time can be saved.

According to a further embodiment of the invention, the second checking step is performed by means of any arbitrary method such as i) a support vector machine, ii) a structured random forest, iii) a one-class classifier or iv) a convolutional neural network (CNN), wherein the arbitrary method is independent of the neural network having a plurality of layers for detecting or respectively classifying objects. The "checking network" is preferably very much smaller than the actual neural network having a plurality of layers and requires little computing time and resources for the checking, which is why it can be referred to as a small neural network.

A checking step can advantageously be performed by a further machine learning method. A support vector machine (SVM), a decision tree or respectively a structured random forest (SRF), a stochastic neural network, such as e.g. a restricted Boltzmann machine (RBM), a one-class classifier (OCC), a convolutional neural network (CNN) or nonlinear regression is indicated by way of example. Alternatively or additionally, the checking step can also be performed by the plausibility tester or a classifier, which is based on threshold value technology, or a predefined list of known false detections such as for example a blacklist or whitelist. In other words, the plausibility tester can match the input data of the neural network with known data, with which the neural network typically performs a false object detection. The false detections of the neural network can be found for example during the training phase of the neural network. The false detections can additionally be known by the architecture of the neural network or can be found out or respectively determined by means of suitable algorithms.

According to an embodiment of the invention, only the result of the last layer (output of the neural network) of the neural network or the result of each layer of the neural network is checked for plausibility. The check for plausibility can also be based exclusively on the last layer of the neural network, wherein the last layer is the output layer of the neural network.

In a checking step it can be provided that exclusively the output or respectively the result of the last layer of the neural network is checked for plausibility. In this case, the plausibility tester can match or compare the input data, e.g. image data, acoustic data, text data, directly with the objects detected or respectively the objects classified by the neural network. To this end, the plausibility tester can itself be a classifier which performs its own and independent object detection, or the plausibility tester concludes on the basis of the confidence values for the objects detected by the neural network that the latter are plausible. If the result of the object detection of the plausibility tester deviates from the result of the object detection by the neural network, it can be concluded that the object detection by the neural network is implausible. The neural network can thereafter perform the object detection once again or request further or respectively new input data. An action such as using the object detection to control a vehicle system can cease based on the implausible data.

In addition to exclusively checking the last layer of the neural network, the result of each individual layer of the neural network can also be checked for plausibility. The results of the check of each layer can also be evaluated, for example, in a higher-level validation layer such that it can be concluded that the object detection by the neural network is correct or false if the summary of the individual checked results of the neural network and/or the results of the check reveal this. Said higher-level validation layer is also referred to as a global method since it is arranged globally above the individual layers of the neural network. It should be noted that, in the checking step, results of a multiplicity of layers of the neural network, but not all of the layers, can be checked for plausibility.

According to an embodiment of the invention, a partial result within at least one layer of the neural network is checked for plausibility. For example, a hidden layer of a network can be checked for plausibility.

The result of individual filters of a specific layer of the neural network can also be checked for plausibility in a checking step, for example by means of the filter response or by means of the confidence values. E.g. it can be known which filters of a specific layer are significantly involved in a correct or false object detection by the neural network. In particular, which filters are involved with respect to certain objects or object classes to be detected such as, for example, other vehicles, lanes, potholes, animals, cyclists, pedestrians or obstacles. During the check, the filter responses can serve as a benchmark for assessing the plausibility of the result, especially if the filter responses comprise extreme swings in value. The analysis at filter level and the inclusion of the filter responses are also referred to as a local method since the checking takes place locally within the layer.

According to a further embodiment of the invention, the results of at least two different layers of the neural network are checked for plausibility so as to conclude whether the object detection by the neural network is correct or false.

In addition to checking the result of a layer, for example of the last layer, or the results of all layers, another arbitrary number or a multitude of results of different layers can also be checked for plausibility in the checking step. In a preferred embodiment of the invention, the results of two or more layers of the neural network can be checked. These two or more checks can subsequently be enlisted in their summary in order to conclude whether a correct or false object detection has been performed by the neural network. To this end, a higher-level validation layer, in which the results of the individual checks are summarized, can be introduced. In said validation layer, the results of the check can be weighted equally or differently so as to conclude whether the object detection by the neural network is correct or false. For example, it can be decided in the validation layer whether it is sufficient to conclude that the object detection by the neural network is false if one confidence value is implausibly high but the remaining confidence values are within the expected range. Consequently, a two-step method for testing the output of a neural network can be created. On the one hand, individual results of layers of the neural network are checked for plausibility and, on the other hand, the summary of all the results of the checked layers is analyzed or respectively evaluated in order to test the object detection by the neural network.

According to an embodiment of the invention, the at least two checks of the at least two layers of the neural network are weighted to varying degrees during the concluding whether the object detection by the neural network is correct or false.

Depending on which of the layers of the neural network the results are checked for plausibility, the outcome of said check can be weighted to varying degrees in the validation layer; in particular, particularly relevant or respectively critical layers of the neural network can be given greater weighting for the object detection.

According to an embodiment of the invention, the method is provided for deployment in a vehicle or a control unit for a vehicle. For example, the method described above and below can be deployed in a driver assistance system, wherein the driver assistance system includes detecting or classifying objects.

In particular, the method is deployed in an optical driver assistance system which requires or respectively uses optical input data. The driver assistance system can be based on a camera, a lidar sensor, a radar sensor, an ultrasonic sensor, a thermal imaging sensor, a laser scanner or any combination of all of the indicated sensors (or any subset thereof).

In an advantageous embodiment, the input data for the neural network for detecting or classifying objects include or contain image data which have been recorded with at least one vehicle camera.

The method described above and below can be utilized, independently of the data, in all architectures such as e.g. long-term short-term memory networks (LSMN/LSTM) and/or recurrent neural networks (RNN). Furthermore, the method can be utilized in continual, life-long and award-based deep-learning methods. These include architectures and methods which are based, for example, on reinforcement learning techniques. A neural network having a feedback loop or parallel paths can also be utilized to better extract features. The described neural networks can additionally be extended to the field of object detection methods. This also applies to signal processing from applications having input data such as thermal images, ultrasound images, magnetic resonance signals, near-infrared spectroscopy and/or computer tomography, but also audio, radar, laser and lidar data, e.g. in medical technology. Furthermore, the method can be used in robotics for machine vision and, in particular, for advanced driver assistance systems (ADAS). The described neural networks can additionally be extended to the field of object detection methods which use spatial and temporal data such as e.g. videos and/or images which contain spatial information such as optical flow, disparity maps or depth maps.

The application of the method described above and below gives rise to numerous advantages during the deployment of neural networks. For example, the false positive rate, that is to say the number of false detections, can be improved, the computing time can be reduced in the event of a false detection, since on identification thereof by the plausibility tester further calculations can be stopped in subsequent layers. The object detection can additionally be improved since the extreme values are checked by a second entity. Consequently, the output of the neural network and the object detection or classification thereof can be more reliable and robust.

The individual steps of the method can be carried out simultaneously or sequentially. There can additionally be a larger period of time between the individual steps of the method. The sequence of the individual steps can also be altered.

A further aspect of the invention relates to a system for testing the output of a neural network having a plurality of layers, which detects or classifies objects. This system comprises an interface (IN) for obtaining at least one result of activations and the confidence value thereof, which is generated in at least one layer of the neural network, a plausibility tester (PP) for checking the result by taking into consideration the confidence value thereof so as to conclude whether the object detection by the neural network is correct or false, and an output interface for outputting objects detected or classified by the neural network. The plausibility tester compares the confidence value for the result with a predefined threshold value. The plausibility tester prevents output, via the output interface, of an object falsely detected by the neural network inasmuch as the plausibility tester has concluded that the object detection is false.

The system can in particular include a microcontroller or microprocessor, a digital signal processor (DSP), an ASIC (application-specific integrated circuit), a FPGA (field-programmable gate array) and the like, and software to perform the corresponding method steps.

The method described above and below can be realized or respectively implemented on a system. The system can read the result or respectively the results of the layer(s) to be checked of the neural network or the filters via an interface. The plausibility tester can subsequently perform the checking step and conclude that the object detection by the neural network is correct or false. The plausibility tester can consist of, for example, a classifier which is not based on a neural network structure and can be arranged downstream of the neural network, in order to check, or respectively to check the plausibility of, the object detection or the classification by the neural network. The plausibility tester can additionally consist of a further network architecture which calculates the probability of a targeted attack on the neural network, such as e.g. an "adversarial attack". The further characteristics of the plausibility tester have already been described within the context of the description of the method, so that a repetition is dispensed with.

According to an embodiment of the invention, the plausibility tester is set up to compare the result of the layer to be checked with a predefined threshold value.

The predefined threshold value can be fallen below or exceeded, or a combination of confidence values for a plurality of filters and/or layers can be exceeded or fallen below. Additionally, a lower threshold value and a higher threshold value can also be provided such that the result should be between the upper and the lower threshold values. If the result of the layer to be checked exceeds or falls below the predefined threshold value, it can be concluded that the object detection by the neural network is correct or false. In particular, the confidence values for the object detection of the individual layers of the neural network can be compared with the predefined threshold value and, if the confidence value is, for example, above 90%, it can be concluded that the object detection by the neural network is false since such high confidence values indicate a manipulation. In other words, the object detection by the neural network would be too good to be plausible.

According to a further embodiment of the invention, the plausibility tester and/or the neural network has/have been trained with a predefined reference data set. Furthermore, training based on one-class classification approaches is possible.

The term "training" denotes the targeted supplying of the neural network with known input data. The result, that is to say the output of the neural network in response to the known input data, can be restored to the neural network during the training. At the same time, the solution or respectively the correct object detection can be predetermined in relation to the input data. In other words, the neural network processes input data and compares the latter with a predetermined nominal result. The neural network then adjusts itself until such time as the desired result is generated by the neural network. A multiplicity of training data is required to enable a neural network to reliably detect and classify a multiplicity of different input data. Depending on the complexity of the neural network and the quantity of training data, the training additionally requires a certain period of time and computing power.

For proper operation and satisfactory object detection, the neural network can be trained with a reference data set. During the training of the neural network, the plausibility tester can simultaneously be trained, e.g. false object detections of the neural network can be incorporated into a blacklist or whitelist such that, during later operation, the data of the blacklist or the whitelist can be matched with the input data or respectively the output of the neural network.

A further aspect of the invention relates to a vehicle having a control system for influencing the driving or a condition of the vehicle, wherein the control system comprises a system which is described above and below, wherein the control system performs a control action based on the output of the neural network following a check by the plausibility tester.

The term "vehicle" is not limited solely to a passenger car, but also includes trucks, buses, motorcycles, tractors, tanks, construction machinery, rail vehicles, ships and aircraft such as helicopters or airplanes.

A further aspect of the invention relates to a program element which, if it is run on a data processing system, instructs the data processing system to carry out the method described above and below.

A further aspect of this invention relates to a computer-readable medium, on which a program element is stored, which instructs the data processing system to carry out the method described above and below.

The present invention can be implemented in digital electronic circuits, computer hardware, firmware or software.

According to a further aspect, the invention relates to a driver assistance system having a system described above and below.

Further features, advantages and possible applications of the invention are set out by the following description of the exemplary embodiments and the figures.

The figures are schematic and are not true to scale. If in the following description of the figures the same reference numerals are indicated, these denote the same or similar elements.

Figure 1:
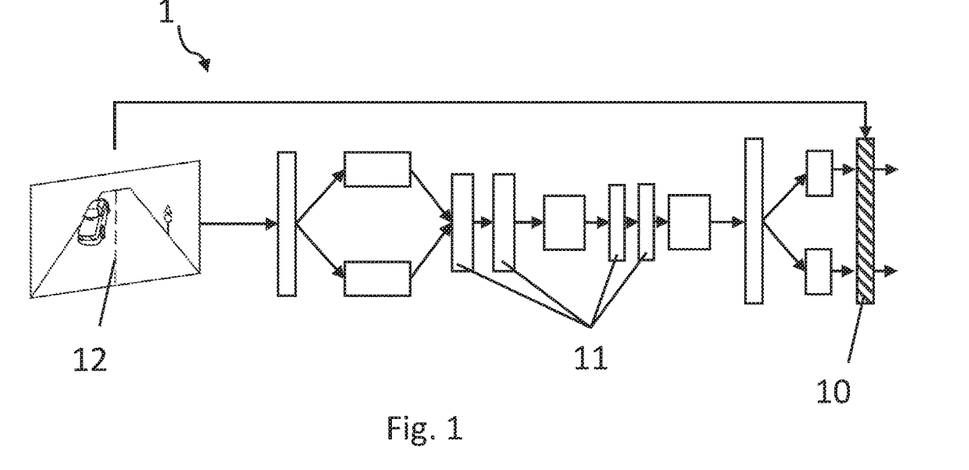
FIG. 1 shows a neural network, wherein the last layer of the neural network is checked according to an embodiment of the invention.

FIG. 1 shows a neural network 1 having a specific architecture according to an embodiment of the invention, wherein the plausibility tester 10 is arranged following the classification stage of the neural network 1, that is to say the last layer 11 (output of the neural network). The plausibility tester 10 checks the result or respectively the output of the neural network 1 by taking into consideration the input image 12. The plausibility tester 10 can itself be a classifier which is different from the neural network 1. If the object detection differs between the neural network 1 and the plausibility tester 10, it can be concluded that the object detection by the neural network 1 is false. The checking of the individual features or respectively the object detection can be prompted, activated or triggered by a comparison of the confidence values for the object detection by the neural network 1. In this exemplary embodiment, the plausibility tester 10 can include a support vector machine (SVM), a small, i.e. subordinate (to the neural network 1), neural network or a structured random forest which checks the plausibility of the object detection by the neural network 1 with the aid of the input image 12 and the results of the neural network 1. A further advantage of said architecture can be that different structures and training methods can be utilized for the reciprocal checking and elimination of false detections, the "false positives". Additionally, the plausibility tester 10 can also conclude that the object detection by the neural network is correct or false on the basis of the confidence values for the individual detected objects or the individual features in the output of the neural network 1. In this example, the confidence values can be the normalized output of the last layer 11 of the network 1. The normalization can, by way of example, be a softmax function which weights the outputs for the respective object class with respect to the total across all object classes. In the following embodiments, the inputs for the calculation of the confidence values for the intermediate layers can be the values of the neural network 1 of the respective filters or nodes. The confidence values can be the filter values or respectively the node values directly, filter values on which a small graphical model is calculated, filter values on which a statistical model is calculated or filter values on which a small neural network is calculated. Confidence values for each individual filter or respectively nodes, for groups of filters or respectively nodes, or for an entire layer can be calculated for the intermediate layers.

In this and the following embodiments, the plausibility tester 10 forms an autonomous entity/subsystem which is different from the neural network 1. The plausibility tester 10 can be spatially integrated into the network but this is not mandatory. In particular, the plausibility tester 10 can be implemented in an embedded system.

Figure 2:
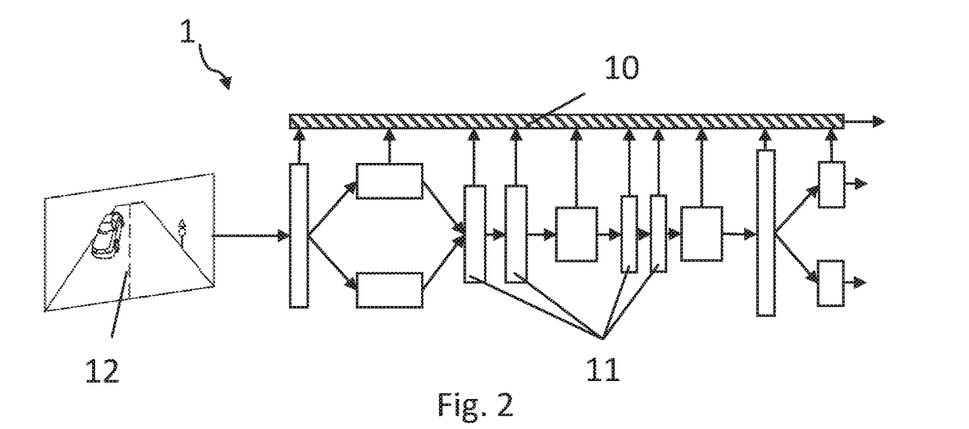
FIG. 2 shows a neural network, wherein each layer of the neural network is checked according to an embodiment of the invention.

FIG. 2 shows a neural network 1 having a specific architecture according to a further embodiment of the invention, wherein the plausibility tester 10 is arranged globally above the neural network 1, as a higher-level validation layer. Said global plausibility tester 10 can check the results or respectively the outputs of each layer 11 of the neural network 1 and conclude therefrom whether the object detection effected by the neural network 1 is correct or false. The plausibility tester 10 can collect the confidence values for the different layers 11 of the neural network 1 in the higher-level validation layer and in each case compare these with a predefined threshold value. It can also be necessary, for example in the global validation layer, that if at least two confidence values for two different layers exceed or fall below their respective threshold value, the validation layer concludes that the object detection by the neural network 1 is correct or false. Both in this embodiment and in all of the others, the threshold value(s) can be determined by experience/experiments. The threshold values are either fixed or can be adjusted or respectively altered via a user interface (not represented).

The global check of individual or all the layers of the neural network 1 can be realized in an exemplary application by a graphical model which is designed to analyze particularly high swings in value in individual or a plurality of filter responses or respectively high confidence values for the object detection. The confidence values which exceed or fall below a predefined threshold value can additionally trigger checking by a further entity such as e.g. a further classifier.

Figure 3:
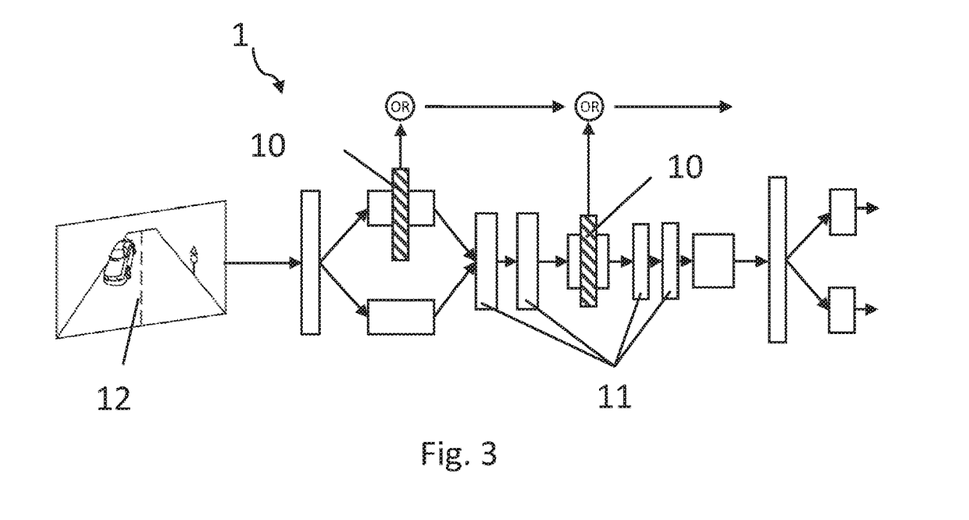
FIG. 3 shows a neural network, wherein selected layers and/or selected filters of a layer of the neural network are tested according to an embodiment of the invention.

FIG. 3 shows a neural network 1 having a specific architecture according to a further embodiment of the invention, wherein the plausibility tester 10 is present locally in the architecture. In other words, the plausibility tester 10 is located within at least one layer 11 of the neural network 1. The plausibility tester 10 can check, or respectively check the plausibility of, locally, that is to say within a layer 11, the respective outputs of the individual filters within this at least one layer 11 of the neural network 1. The local plausibility testers 10 can be designed for high swings in value of individual or a plurality of filter responses within a layer 11. A linking of said local plausibility tester 10 is additionally represented in FIG. 3. In other words, the results of the checking of a plurality of local plausibility testers 10 can be connected by means of and/or by linking to each other. As soon as a local plausibility tester 10 or a plurality of local plausibility testers 10 conclude that a result of a layer 11 or respectively of a filter of said layer 11 is false, it can be concluded that the object detection by the entire neural network 1 is false.

FIG. 3 additionally shows a higher-level validation layer of the individual local plausibility testers 10. This consolidates the checks of the local plausibility testers 10 into one total result. In the simplest design, such a linking could be based on an AND or an OR linking. In a further embodiment, the results of the local plausibility testers 10 can be weighted differently in the validation layer. In other words, a plausibility tester 10 can be taken into greater consideration in a total result in a particularly relevant layer 11 for a correct or respectively false object detection by the neural network 1 than another plausibility tester 10 in another layer 11 of the neural network 1. The validation layer can subsequently conclude that the output of the neural network is plausible.

Figure 4:
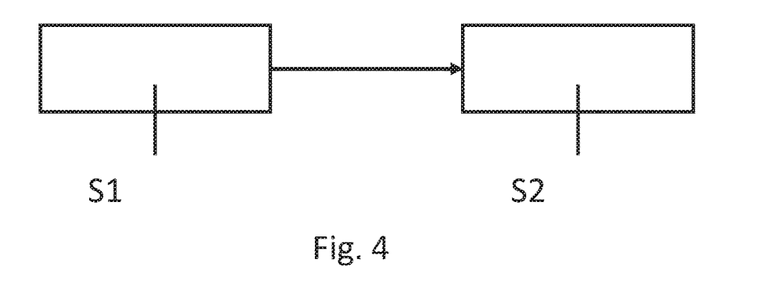
FIG. 4 shows a flow chart of a method for testing a neural network according to an embodiment of the invention.

FIG. 4 shows a flow chart of a method for testing the output of a neural network. In a step S1, a result and, if applicable, the confidence value thereof is read from one or more layer(s) of a neural network into a plausibility tester. The plausibility tester checks, in step S2, the plausibility of the result of the layer(s) of the neural network by taking into consideration the confidence value for this result so as to conclude whether the object detection by the neural network is correct or false. Within the first checking step S2, the confidence value for the result can be compared or respectively matched with a predefined threshold value. For example, the confidence value for the layer or respectively for the filter of the layer can be compared with the predefined threshold value and if the confidence value exceeds the threshold value, the plausibility tester can conclude that the object detection by the neural network is false, or a second checking step (not represented) can be triggered.

Figure 5:
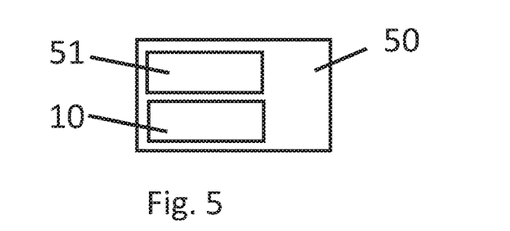
FIG. 5 shows a system for testing a neural network according to an embodiment of the invention.

FIG. 5 shows a block diagram of a system 50 for checking the output of a neural network. The system 50 comprises an interface 51 and a plausibility tester 10. The output of the neural network, the output of the individual layers and/or the output of the individual filters within a layer can be read into the system 50, as well as the corresponding confidence values, via the interface 51. The read-in output of the neural network or respectively the filters and layers thereof can be checked by the plausibility tester 10, such that this can conclude that the object detection by the neural network is correct or false. If the plausibility tester 10 concludes, for example, that the object detection by the neural network is false, the object detection can be repeated or respectively the function based on the object detection, such as e.g. evading or braking, is not performed. In other words, the plausibility tester 10 can perform or respectively carry out the method described above and below and the embodiments thereof. Consequently, false detections, so-called "false positives", by the neural network can be reduced. This increases the reliability of the total system (neural network 1 and system 50 for testing the neural network) which, in turn, increases customer satisfaction.

Figure 6:
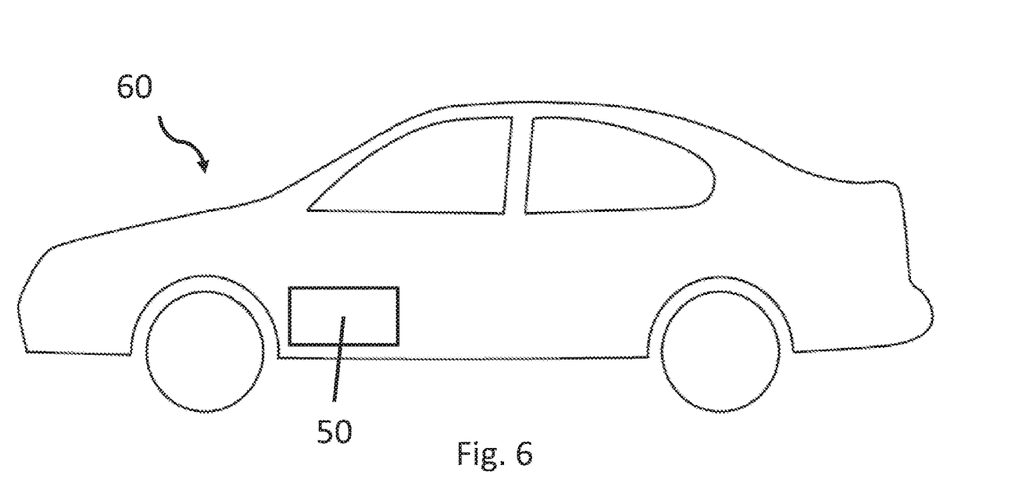
FIG. 6 shows a vehicle having a system for testing a neural network according to an embodiment of the invention.

FIG. 6 shows a schematic representation of a vehicle 60 having a system 50 for testing the output of a neural network. In particular, in the case of a vehicle 60 having a driver assistance system which has one or more neural networks for object detection, such a system 50 can be deployed in order to check the output of the neural network. The objects detected by the neural network can activate vehicle functions such as, for example, a brake assistant or a lane change. The result of the check can influence the way in which the driver assistance system is supposed to react to the object detection. By way of example, braking can be moderated if the checking indicates a false detection, or the driver is prompted, if time allows, to verify the detection via a user interface with a signal function, for example by means of a suitable input.

The invention claimed is:

1. A computer-implemented method for testing an object detection output of a trained neural network having a plurality of layers, which detects or classifies objects, the method comprising:
reading at least one result from at least one first layer and a confidence value thereof, which is generated in the first layer of the trained neural network during an inference process;
checking a plausibility of the result by taking into consideration the confidence value thereof so as to conclude whether the object detection by the trained neural network during the inference process is correct or false;
wherein the first checking step includes comparing the confidence value for the result with a predefined threshold value; and
wherein in the event that it is concluded in the first checking step that the object detection output is false, utilization of the object falsely detected by the trained neural network during the inference process is prevented.

2. The method according to claim 1, wherein the results of at least two different layers of the neural network are checked for plausibility so as to conclude whether the object detection by the neural network is correct or false.

3. The method according to claim 2, wherein the results of at least two checks of the at least two layers of the neural network are weighted to varying degrees during the concluding whether the object detection by the neural network is correct or false.

4. The method according to claim 1, wherein it is concluded whether the object detection by the neural network is correct or false if the confidence value for the result exceeds or falls below the predefined threshold value.

5. The method according to claim 1, wherein a second checking step is performed if the confidence value for the result exceeds or falls below the predefined threshold value, and output of the object falsely detected by the neural network is only prevented if the second checking step confirms that the object detection is false.

6. The method according to claim 5, wherein the second checking step is implemented by means of i) a support vector machine, ii) a structured random forest, iii) a one-class classifier or iv) a small neural network, which is independent of the neural network having a plurality of layers.

7. The method according to claim 1, wherein only the result of the last layer of the neural network or the result of each layer of the neural network is checked for plausibility.

8. The method according to claim 1, wherein a partial result within at least one layer of the neural network is checked for plausibility.

9. The method according to claim 1, wherein the method is deployed in a driver assistance system in a vehicle, wherein the driver assistance system includes detecting or classifying objects.

10. The method according to claim 9, wherein the input data for the neural network for detecting or classifying objects include image data of at least one vehicle camera.

11. A system-for testing the output of a trained neural network having a plurality of layers, which detects or classifies objects, comprising:

an interface for obtaining at least one result and the confidence value thereof, which is generated in at least one first layer of the trained neural network during an inference process;

a plausibility tester for checking the result by taking into consideration the confidence value thereof so as to conclude whether the object detection by the trained neural network during the inference process is correct or false, an output interface for outputting objects detected or classified by the trained neural network, wherein the plausibility tester compares the confidence value for the result with a predefined threshold value, and wherein the plausibility tester prevents output of an object falsely detected by the trained neural network inasmuch as the plausibility tester has concluded that the object detection is false during the inference process.

12. The system according to claim 11 wherein the plausibility tester and/or the neural network has/have been trained with a predefined reference data set.

13. A vehicle having a control system for influencing the driving or a condition of the vehicle, wherein the control system comprises a system according to claim 11, wherein the control system performs a control action based on the output of the neural network Hollowing a check by the plausibility tester.

14. A non-transitory computer-readable medium having a program stored thereon, that when executed by a processor, instructs the processor to perform the computer-implemented method according to claim 1.

* * * * *